UNITED STATES PATENT OFFICE

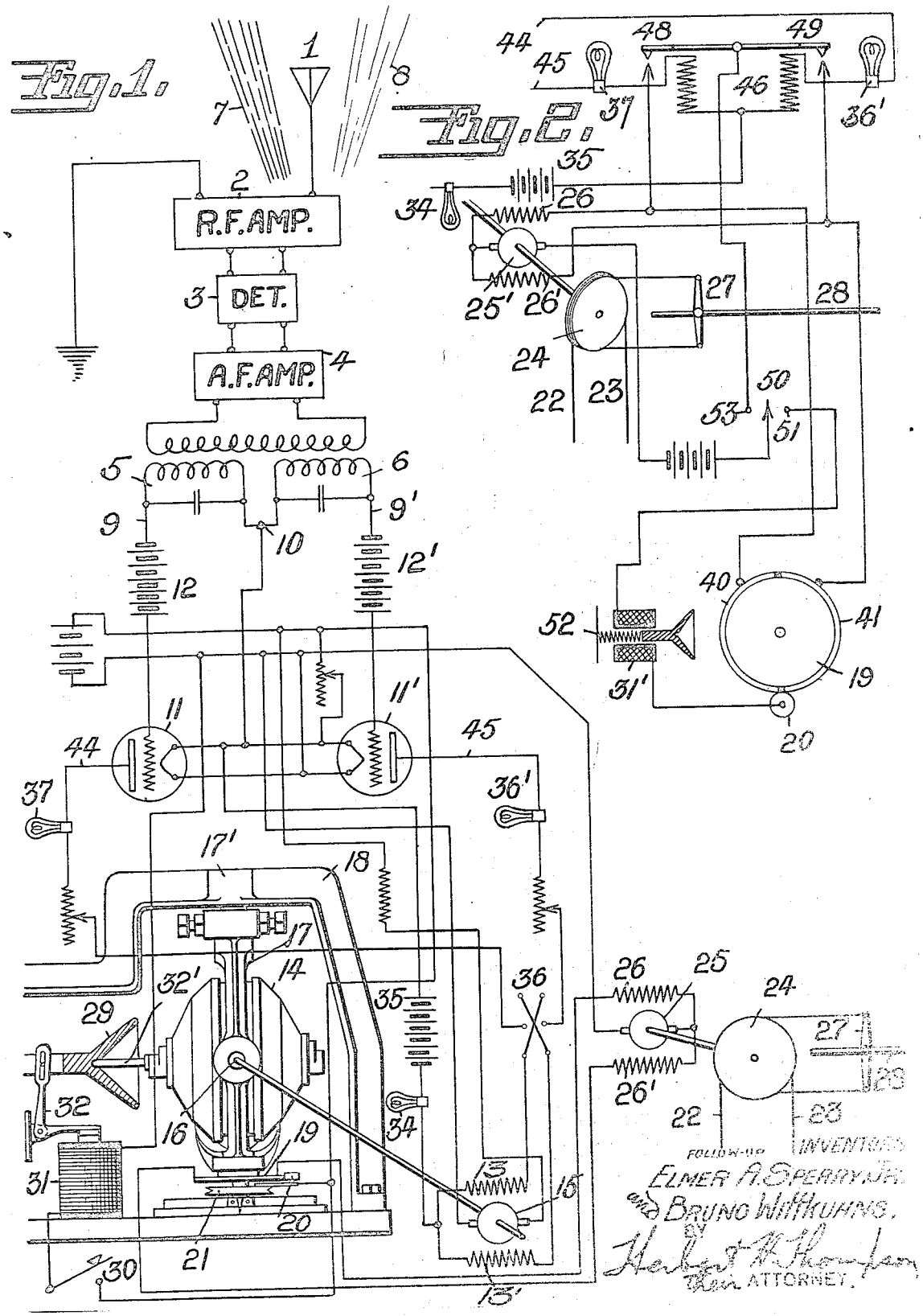

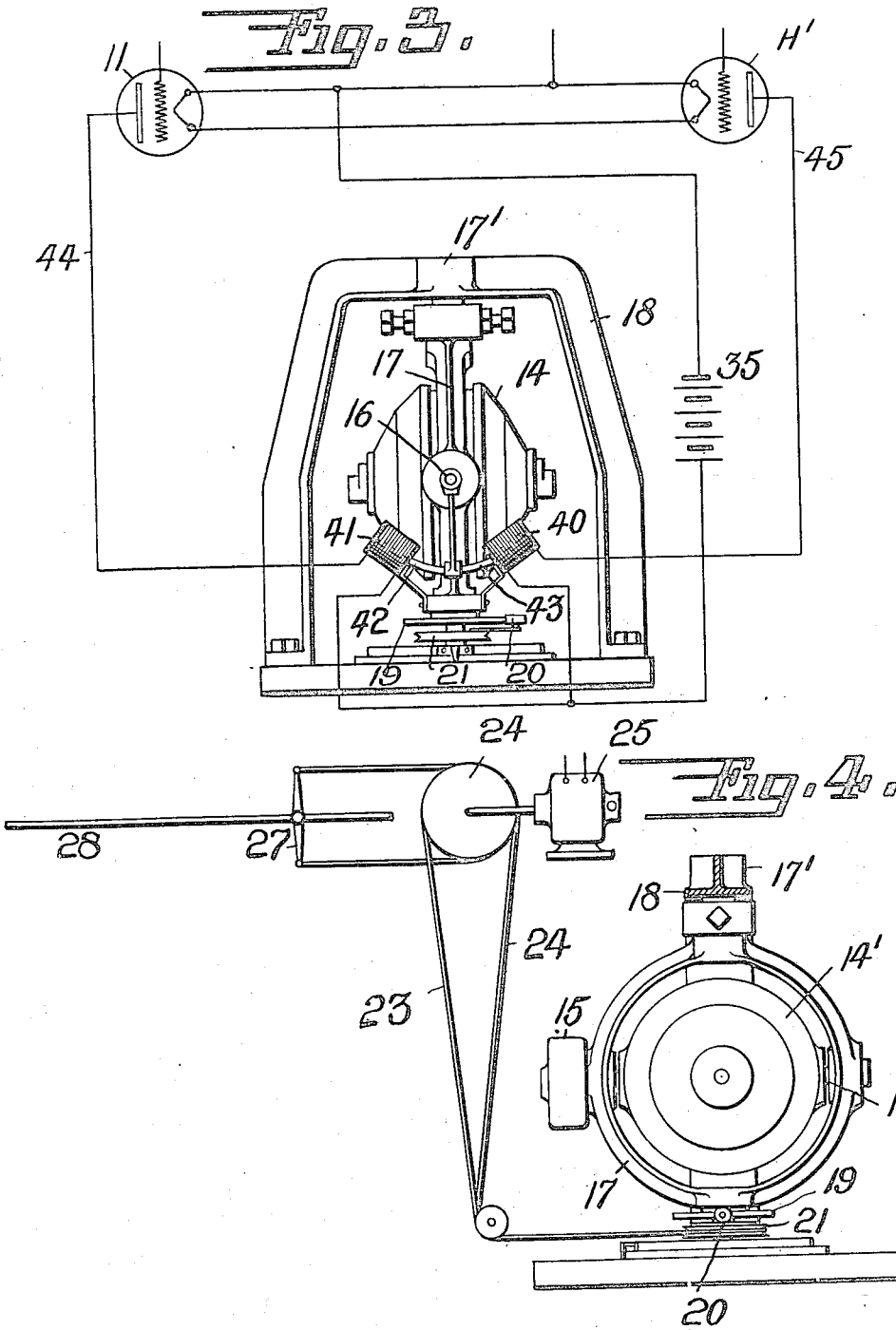

ELMER A. SPERRY, JR., OF BROOKLYN, NEW YORK, AND BRUNO A. WITTKUHNS, OF CHATHAM, NEW JERSEY, ASSIGNORS TO SPERRY GYROSCOPE COMPANY, INC., OF BROOKLYN, NEW YORK, A CORPORATION OF NEW YORK

DIRECTIONAL RADIO STEERING DEVICE

Application filed February 20, 1930, Serial No. 429,886. Renewed June 23, 1932.

This invention relates to automatic or semi-automatic steering means for dirigible craft, such as aircraft. The invention is especially designed to overcome the hazards of flying blind, that is, in fog or clouds, and the purpose is to maintain an aircraft flying toward the radio beacon or other transmitting stations regardless of weather conditions or the skill of the pilot. For the above purpose we prefer to employ as a baseline a gyroscope, and to correct the course from time to time automatically from a directional radio receiving means on the craft. This may be done either through the gyroscope or independently of the same.

Referring to the drawings in which several forms of the invention are shown:

Fig. 1 is a wiring diagram showing the elements of the invention, the gyroscope being shown in side elevation.

Fig. 2 is a diagram of a modified form of the invention in which a gyroscope is not employed, at least when the craft is being steered from the radio beacon.

Fig. 3 shows a side elevation of a modified form of torque-applying means for the gyroscope.

Fig. 4 is an end elevation of the gyroscope shown in Fig. 1, showing also diagrammatically the servo motor operated therefrom with the follow-up connections.

The usual practice in sending out radio beacons is to send out on a single carrier wave two signals of different audio-frequencies which are transmitted when the directional sending apparatus is at different angles so that in effect two beams, at an angle to each other, are sent out. The present practice is to have some form of audible or visible indicator on the aircraft which tells the operator which beam is the stronger and thereby tells him which way to turn to keep midway between the beams by which he keeps his craft headed toward the transmitting station. Our invention is shown designed to operate with such a form of radio beacon although it is obvious that with slight modification the invention could be adapted to work with other forms of radio beacons or signals, such as where separate carrier waves are transmitted at an angle, or a direction finder on the craft is used with one or more sending stations.

In Fig. 1, 1 represents the antenna on the dirigible craft which picks up the radio signals represented by beams 7 and 8. Such signals may be amplified in any suitable form of radio detecting and amplifying means, such as frequency amplifier 2, detector 3, and a broad band audio-frequency amplifier 4. Either incorporated in amplifier 4 or inductively coupled to the output of said amplifier are a pair of audio-frequency oscillators 5 and 6, one of which is tuned to resonance for the audio-frequency of one of the signals 7, and the other to the frequency of the other signal 8. The terminals 9 and 10 of the oscillator 5 are connected between two elements of the vacuum tube 11, say between the grid and the filament, a "C" battery 12 being placed in this circuit to maintain the proper grid bias. Similarly the terminals 9' and 10' of the oscillator 6 are connected through the "C" battery 12' between the grid and filament of vacuum tube 11'.

The plate of each tube, directly or indirectly, is connected through wires 44 and 45 respectively to separate windings 13 and 13' respectively on a device associated with the gyroscope 14 for the purpose of changing the course in one direction or the other, depending upon which winding 13 or 13' is excited the stronger. By having the proper grid bias on the tubes, each tube will act as a detector tube to rectify the current and transmit sufficient D. C. current to excite the winding 13 and 13' which is in circuit of the oscillator receiving the stronger signals more strongly than the other winding. As shown, said windings form the opposed field windings of an electric motor 15 or other torque-applying device which is mounted on the trunnion axis 16 of the gyroscope 14 (see Fig. 4), so as to exert a torque on the gyroscope about its horizontal axis in one direction or the other, causing precession of the gyroscope about its vertical axis to change its position on the craft. The gyroscope proper is shown as mounted with three degrees of freedom, the gyro casing 14' being pivoted on horizontal trunnions 16 within the vertical ring 17, the vertical ring being mounted for turning about a vertical axis 17' within the fixed frame 18.

The position of the gyroscope relative to the aircraft serves to control the rudder or other steering element. This may be effected by means of reversing contacts on the gyroscope. As shown, said contacts are in the form of a split contact ring 19 and having a pair of annular contact segments 40, 41 (see Fig. 2) secured to the vertical ring 17. Cooperating therewith is a trolley or brush 20 mounted at the base of the gyroscope. Preferably, instead of having the contact fixed, we provide a follow-up connection thereto from the rudder or servo motor so that the rudder is only moved in proportion to the deviation. Said follow-up may be introduced by mounting the trolley 20 on a pulley or drum 21, which is turned by means of the follow-up wires or cables 22 and 23 leading to the servo motor drum 24 (see also Fig. 4).

The contacts on the gyroscope may control any form of servo motor, the motor shown being an electric motor 25 having opposed field windings 26—26' which are excited from the aforesaid contacts. The drum 24 is shown as directly connected to the rudder bar 27 which carries the rudder 28. The gyroscope is also shown as equipped with a lock or cage 29. This is normally withdrawn when the gyro is operated as by a spring (not shown) but may be brought into operation at the will of the aviator by pressing key 30 which excites electro-magnet 31, thus pushing the lock to the right in Fig. 1 through the bell crank lever 32. The lock is shown in the form of a bell mouthed member engaging a pin 32' projecting axially from the gyro casing. It will be understood that the apparatus is so arranged that the motor 15 will apply a torque on the gyroscope in such a direction as to cause the gyroscope to turn toward the weaker beam and thereby turn the plane toward the weaker beam until the beams become of equal strength so that the aircraft is kept headed in such a direction as to maintain the intensity of the two beams substantially equal or in predetermined ratio.

If, however, the plane passes over the sending station and it is desired to continue the flight in the same direction, it is necessary that the relation between the torque motor and beam intensities be reversed. The means we have shown for effecting this comprises a visual indicator, such as a lamp 34 in the common return from the motor 15 and the B battery 35. The moment the station is passed over no signal is received and hence the lamp will be momentarily extinguished or greatly dimmed, thereby notifying the aviator that he has passed over the station. At that time the aviator throws the reversing switch 36, thus reversing the direction of the torques applied to the gyroscope and enabling him to continue on his course. If he does not desire to continue but desires to land near the sending station, the switch should not be thrown and the plane will start circling around the sending station. We have also shown a visual indicator 36', 37, in circuit with each motor field so that the aviator may have a visual indication of the relative intensity of the radio beams as well, so that no other direction finder is needed. It will be understood that the wiring in Fig. 1 is diagrammatic only, and no attempt has been made to show all of the condensers, choke coils, etc., which would be used in designing such a circuit, or to indicate the relative size of such elements.

In Fig. 3 a slightly different form of torque-applying device is shown. In this case a pair of solenoids 40—41 are fixed on opposite sides of the vertical ring and each act on magnetic cores 42—43 secured to the gyro trunnion. Said solenoids may be connected in circuit in the same manner as the fields 13—13' and will exert opposed torques on the gyroscope as will be readily understood. No cage is shown in this figure because locking means is unnecessary for the automatic operation of the form of device in Figs. 1, 3 and 4.

In Fig. 2 is represented a different form of the invention which may be used either entirely without a gyroscope or in conjunction with a gyroscope. In this form of the invention the output of the tubes 11 and 11' is led through the wires 44—45 directly to a relay 46 and the reversing contacts 48—49 on the relay operate the servo motor 25'. The radio beacon, therefore, in this form of the invention could steer the plane alone. However, we prefer to employ it in conjunction with a caged gyroscope, such as shown in Fig. 1, as follows: Normally the gyroscope would control the steering of the plane as in Fig. 1. Under these conditions the switch 50 is on contact 51 and the gyroscope is held uncaged by solenoid 31' against the action of compression spring 52. When, however, the lamps 36' and 37 or other radio beam indicators show the pilot that he is getting off his beacon course, the pilot throws switch 50 onto contact 53 which does two things—first, it cages the gyroscope and renders the gyro control inoperative by breaking the circuit to the solenoid 31' and contacts 19—20, and second, it throws the servo motor 25 onto the relay 46. The pilot leaves the radio beacon in control until the lamps show that he is again on the beacon course when the throws switch 50 back, which causes the gyroscope to be released and to again assume control on the new course. By using a gyroscope to steer normally, the hunting or zigzagging of the plane, which would take place if the plane were controlled from the beacon alone, is avoided.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. An automatic steering device for dirigible craft comprising a gyroscope having freedom about a vertical and a horizontal axis, means actuated therefrom for normally steering the craft, means for applying a torque about the horizontal axis of the gyroscope in either direction, and radio responsive means for controlling said torque means.

2. An automatic steering device for dirigible craft comprising a gyroscope having freedom about a vertical and a horizontal axis, means actuated therefrom for normally steering the craft, radio receiving means selectively responsive to the frequencies of a plurality of radio beams, and differential means actuated thereby for turning the craft toward the beam having the lesser intensity.

3. An automatic steering device for dirigible craft comprising a gyroscope having freedom about a vertical and a horizontal axis, means actuated therefrom for normally steering the craft, radio receiving means selectively responsive to the frequencies of a plurality of radio beams, differential means actuated thereby for applying a torque about the horizontal axis of the gyroscope such as to cause precession of the gyroscope in a direction to maintain the craft midway between the beams.

4. An automatic steering device for dirigible craft comprising a gyroscope having freedom about a vertical and a horizontal axis, means actuated therefrom for normally steering the craft, radio receiving means selectively responsive to the frequencies of a plurality of radio beams, differential means actuated thereby for turning the craft in a predetermined direction with respect to the stronger beam, and means for reversing the direction of turn when the beam transmitting station is passed over.

5. Means for automatically steering an aircraft from radio beacons having different frequencies including the combination with the rudder and a radio receiver on the aircraft, of a plurality of oscillators therein respectively tuned to the frequencies transmitted by the beacons, and reversible power means actuated from said oscillators for turning the rudder to turn the craft toward the weaker beam.

6. Means for automatically steering an aircraft from radio beacons having different frequencies including the combination with the rudder, a steering gyroscope, and a radio receiver on the aircraft, of a plurality of oscillators therein respectively tuned to the frequencies transmitted by the beacons, and reversible power means actuated from said amplifying means for applying torques on the gyroscope and thereby cause the craft to turn toward the weaker beam.

7. An automatic steering device for dirigible craft comprising a gyroscope having freedom about a vertical and a horizontal axis, means actuated therefrom for normally steering the craft, and electrical means for applying a torque about the horizontal axis of the gyroscope in either direction in response to the relative strength of a pair of directional radio beams.

8. An automatic steering device for dirigible craft comprising a gyroscope having freedom about a vertical and a horizontal axis, means actuated therefrom for normally steering the craft, radio receiving means selectively responsive to the frequencies of a plurality of radio beams, differential means actuated thereby for turning the craft toward the beam having the lesser intensity, and means for locking the gyroscope and rendering the control therefrom inoperative while the course is being changed.

9. Means for automatically steering an aircraft from radio beacons having different frequencies including the combination with the rudder and a radio receiver on the aircraft, of a plurality of oscillators therein respectively tuned to the frequencies transmitted by the beacons, reversible power means actuated from said oscillators, and a gyroscope for normally maintaining the course, said power means being connected to the gyroscope so as to change the course to bring the craft midway between the radio beams.

10. Means for automatically steering an aircraft from radio beacons having different frequencies including the combination with the rudder and a radio receiver on the aircraft, of a plurality of oscillators therein respectively tuned to the frequencies transmitted by the beacons, reversible power means actuated from said oscillators for turning the rudder to turn the craft toward the weaker beam, a gyroscope for normally controlling the rudder through said power means to maintain the course, and means for shifting the control of said power means from said gyroscope to said oscillators when the craft strays from the radio course.

11. An automatic steering device for dirigible craft comprising a gyroscope having freedom about a vertical and a horizontal axis, means actuated therefrom for normally steering the craft, electrically controlled means for applying a torque about the horizontal axis of the gyroscope in either direction, and radio means for bringing said torque into operation.

12. An automatic steering device for dirigible craft comprising a gyroscope having freedom about a vertical and a horizontal axis, means actuated therefrom for normally steering the craft, electrically controlled means for applying a torque about the horizontal axis of the gyroscope in either direction, and radio means for bringing said torque into operation in either direction to cause a change of course by causing slow precession of said gyroscope about its vertical axis.

13. In a system for guiding aircraft toward a radio transmitting station, the combination with the rudder of the craft and a servo motor for turning the same, a gyroscope for controlling said servo motor to maintain the craft on any predetermined course, and directional radio responsive means on the craft for correcting the course maintained by the gyro to direct the course toward the transmitting station.

14. In a system for guiding aircraft toward a radio transmitting station, a directional gyroscope by which a course may be set and maintained, directional radio responsive means on the craft responsive to the relative direction of a transmitting station, and means controlled by said radio means for correcting or altering the course indicated by the gyroscope.

15. An automatic steering device for dirigible craft comprising a gyroscope having freedom about a vertical and a horizontal axis, means actuated therefrom for normally steering the craft, means for applying a torque about the horizontal axis of the gyroscope in either direction, directional radio responsive means on the craft responsive to the relative direction of a transmitting station, and means controlled by said radio means for bringing said torque in action to correct the position of the gyroscope.

16. An automatic steering device for dirigible craft comprising a gyroscope having freedom about a vertical and a horizontal axis, means actuated therefrom for normally steering the craft, directional radio receiving means on the craft, means actuated therefrom for turning the craft toward the sending station, and means for locking the gyroscope and rendering the control therefrom inoperative while the course is being changed.

In testimony whereof we have affixed our signatures.

ELMER A. SPERRY, Jr.
BRUNO A. WITTKUHNS.